United States Patent
Chávez Hurtado et al.

(10) Patent No.: US 12,496,280 B2
(45) Date of Patent: Dec. 16, 2025

(54) PHARMACEUTICAL OPHTHALMIC COMPOSITIONS FOR PROTECTION AGAINST BLUE LIGHT

(71) Applicant: SOPHIA HOLDINGS, S.A. DE C.V., Jalisco (MX)

(72) Inventors: Paulina Chávez Hurtado, Zapopan (MX); Juan Manuel Martinez Alejo, Zapopan (MX); Juan de Dios Quintana Hau, Zapopan (MX)

(73) Assignee: Sophia Holdings, S.A. DE C.V., Jalisco (MX)

( * ) Notice: Subject to any disclaimer, the term of this patent is extended or adjusted under 35 U.S.C. 154(b) by 0 days.

(21) Appl. No.: 18/066,300

(22) Filed: Dec. 15, 2022

(65) Prior Publication Data

US 2023/0190672 A1   Jun. 22, 2023

Related U.S. Application Data

(60) Provisional application No. 63/292,081, filed on Dec. 21, 2021.

(51) Int. Cl.
| | | |
|---|---|---|
| A61K 31/05 | (2006.01) | |
| A61K 31/683 | (2006.01) | |
| A61K 31/715 | (2006.01) | |
| A61K 35/06 | (2006.01) | |
| A61K 47/06 | (2006.01) | |
| A61K 47/44 | (2017.01) | |
| A61P 25/20 | (2006.01) | |

(52) U.S. Cl.
CPC ............ *A61K 31/05* (2013.01); *A61K 31/683* (2013.01); *A61K 31/715* (2013.01); *A61K 35/06* (2013.01); *A61K 47/06* (2013.01); *A61K 47/44* (2013.01); *A61P 25/20* (2018.01)

(58) Field of Classification Search
CPC .... A61K 31/05; A61K 31/683; A61K 31/715; A61K 35/06; A61K 47/06; A61K 47/44; A61P 25/20
See application file for complete search history.

(56) References Cited

U.S. PATENT DOCUMENTS

| | | | |
|---|---|---|---|
| 2012/0003198 A1 | 1/2012 | Barker et al. | |
| 2019/0125758 A1* | 5/2019 | Popov | A61K 9/5031 |
| 2022/0354788 A1* | 11/2022 | Quintana Hau | A61K 47/26 |

FOREIGN PATENT DOCUMENTS

| | | | | |
|---|---|---|---|---|
| CA | 3152637 A1 | 3/2021 | | |
| CN | 103845278 A | * | 6/2014 | |
| CN | 112426414 A | * | 3/2021 | A61K 31/01 |
| WO | WO-2012059158 A1 | * | 5/2012 | A61K 31/122 |

OTHER PUBLICATIONS

P. Galera, et al. (Ocular lubricants: what is the best choice?, Ciência Rural, Santa Maria, v.46, n. 11, p. 2055-2063, 2016, https://doi.org/10.1590/0103-8478cr20160020. (Year: 2016).*
Bruno, Gene, "Lutein & Zeaxanthin: Protection Against Blue Light Damage to Eyes", Supplement Science, Vitamin Retailer., 2017, 44-47.
Johnson, Elizabeth J., "A Biological Role of Lutein", Food Reviews International. vol. 20, No. 1, 2004, 1-16.
Lim, Chaemin, et al., "Preparation and characterization of a lutein loading nanoemulsion system for ophthalmic eye drops", Journal of Drug Delivery Science and Technology. 36, 2016, 168-174.
Bhattacharjee, Sourav , "DLS and zeta potential—What they are and what they are not?", Journal of Controlled Release 235:337-351 (Jun. 10, 2016).
Vicario-De-La-Torre, et al., "Design and Characterization of an Ocular Topical Liposomal Preparation to Replenish the Lipids of the Tear Film", Invest Ophthalmol Vis Sci. 55:7839-7847 (2014).

* cited by examiner

*Primary Examiner* — James H Alstrum-Acevedo
*Assistant Examiner* — Manahil Mirghani Ali Abdalhameed
(74) *Attorney, Agent, or Firm* — Myers Bigel, P.A.

(57) ABSTRACT

The present invention relates to ophthalmic pharmaceutical compositions in the form of oil-in-water (O/W) nanoemulsions comprising a mixture of specific components with modified physicochemical properties, in combination with an oil-xantophyll mixture for protection against blue light.

8 Claims, 5 Drawing Sheets

PHARMACEUTICAL OPHTHALMIC COMPOSITIONS FOR PROTECTION AGAINST BLUE LIGHT

STATEMENT OF PRIORITY

This application claims the benefit, under 35 U.S.C. § 119(e), of U.S. Provisional Application No. 63/292,081 filed on Dec. 21, 2021, the entire contents of which is incorporated by reference herein.

FIELD OF THE INVENTION

The present invention is directed to ophthalmic pharmaceutical compositions. More specifically, the present invention relates to ophthalmic pharmaceutical compositions in the form of oil-in-water nanoemulsions (O/W) comprising a mixture of base components and a compound belonging to the group of xanthophylls, which has proven to be effective for the protection of the eyes against the negative effects produced by the blue light from different natural and artificial light sources.

The present invention is also related to manufacturing processes of ophthalmic pharmaceutical compositions and their use as protection against blue light and as adjuvant in the treatment of dry eye.

BACKGROUND OF THE INVENTION

The use of various electronic devices for our daily activities has increased substantially over the years worldwide.

According to FORBES reports, on average, "the information consumed by the average human today is 50 times greater than it was 50 years ago," and the vast majority of such information comes from electronic blue light-emitting devices. Derived from the above, there are population groups that "can be in front of televisions or computers up to 12 hours per day"; and the hours spent in front of a mobile device should be added to this.

Today's extremely high exposure of humans to blue light emitting electronic devices has led the National Institute of Health (NIH) to study the impact of spending so many hours in front of electronic devices. In a recent NIH study (2018) it was reported that "children who consume information from electronic light-emitting devices have lower scores on thinking and language tests compared to children who are not exposed to blue light emitters."

The increasingly frequent use of these devices, which are a constant source of blue light, has been associated in the literature with different conditions, the most important being potential damage to the retina and alterations in the sleep cycle derived from the interference caused by blue light, e.g., on melatonin metabolism.

Studies reported from the University of Birmingham in 2017 allude to "recent laboratory results using animal models suggest that receiving too much blue light can damage some of the sensitive cells in the retina," which has now created several symptoms known as digital eyestrain (DES).

Also, while it is true that artificial sources of blue light are relevant, the major source of blue light is sunlight. Furthermore, it has also been reported in the literature that overexposure to ultraviolet light from the sun also increases the risks of eye diseases, including cataracts, macular degeneration, etc.

In 2004, Johnson E J et al in their study entitled "A biological role of lutein", initially proposed that some xanthophylls could prevent or limit retinal damage through a filtering effect of visible light, coupled with their action as antioxidants. Furthermore, clinical and epidemiological studies have suggested that low levels of lutein in human plasma may be a risk factor for age-related macular degeneration (AMD). Therefore, xanthophylls, and particularly lutein, have been recognized as an important supplement in the prevention of eye diseases and sleep disorders.

Notwithstanding the above, products containing xanthophylls and that are marketed as preventive and/or therapeutic agents, are mostly oral preparations, since, due to their physicochemical properties, xanthophylls are very poorly soluble in water. Thus, the use of this type of compounds and their benefits represents a technical challenge when trying to incorporate them into matrices whose formulation is designed to be used in routes of administration where solubility plays an important role, e.g., the ophthalmic route of administration.

In the prior art, some solutions have been proposed to the aforementioned problem, for example, the Chinese patent application CN103845278A suggests an emulsion, which tries to improve the residence time of certain hydrophobic compounds in the eye by formulating it in the form of an eye gel that, logically, will remain longer in contact with the eye surface due to its viscosity, and which comprises 0.01%-2% lutein and an emulsifier.

Lim et al. (2016) "Preparation and characterization of a lutein loading nanoemulsion system for ophthalmic eye drops", on the other hand, exemplifies different compositions of lutein in nanoemulsion for an ophthalmic drop formulation, which comprise isopropyl myristate, ethanol, Tween 80 and triacetin.

The technologies described in the prior art therefore still have different disadvantages in the formulation of xanthophylls for ophthalmic and other routes of administration. So far, for example, emulsions are used that tend to be unstable and therefore lack adequate bioavailability. Furthermore, they have low sensitivity ranges, that is, any benefit associated with the use of the previously described compositions as a protective filter from blue light can only be perceived when the amount of light is high.

In view of the foregoing, there is a need for highly sensitive and stable ophthalmic compositions that can block blue light from any natural or artificial source, and that can also be used as adjuvants in the treatment of various eye conditions and disorders related to inadequate melatonin production.

Thus, the present disclosure achieves for the first time an effective ophthalmic approach to diminish the negative effects derived from blue light by acting in situ directly on the eyes as a physical filter, and, for the first time describes an ophthalmic approach for treating some sleep disorders related to melatonin metabolism and its effects as a result of the large amounts of blue light that we all receive on a daily basis.

SUMMARY OF THE INVENTION

To overcome the deficiencies of the prior art, the present invention provides ophthalmic pharmaceutical compositions in the form of a nanoemulsion (O/W), said nanoemulsion being based on particular components whose physicochemistry has been modified in such a way that, as will be explained in more detail in the examples section of the present disclosure, they have proven to be effective as companions of xanthophylls for administration by ophthalmic routes.

In other objective embodiments of the present invention, the ophthalmic pharmaceutical compositions comprise as active substance a xanthophyll in combination with mineral oils and/or natural oils.

Additional embodiments of the present invention relate to methods and use of the above-described ophthalmic pharmaceutical compositions in the treatment of visual fatigue by blue light, digital visual fatigue, dry eye, as well as in the improvement of the sleep cycle in a subject by preventing blue light from interrupting the normal cycle of melatonin production. The compositions of the present invention act directly on the eye by means of a mechanism of protection and blocking the passage of blue light from any natural or artificial source of light.

Another object of the present invention is to provide manufacturing processes for the above-described ophthalmic pharmaceutical compositions.

Another object of the present invention is to provide a pharmaceutical system for containing the ophthalmic compositions of the present invention free of preservatives, as well as for its administration.

These and other objectives will be apparent to the person skilled in the technical field to which the present invention pertains, based on the following detailed disclosure, the accompanying figures, as well as the appended claims.

BRIEF DESCRIPTION OF THE DRAWINGS

Having described the invention in the above general terms, reference will now be made to the accompanying drawings showing representative embodiments of the present invention, where.

DETAILED DESCRIPTION OF THE INVENTION

Figure 1:
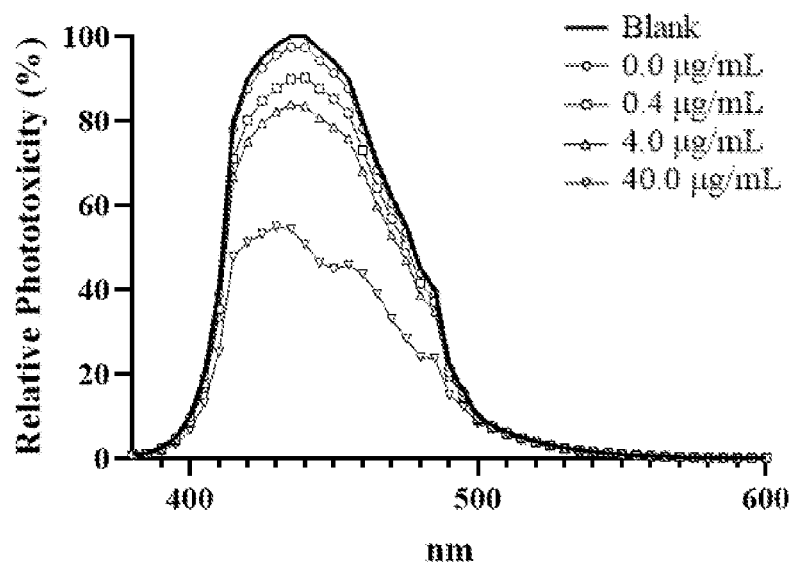
FIG. 1 illustrates the results of the protection provided by the composition of Lutein with DM PC of the present invention, by decreasing the relative phototoxicity exerted by exposure to blue light.

Some aspects of the present invention will now be described in more detail with further reference to the accompanying drawings in which some, but not all, of the advantages of the present invention are shown. Indeed, various embodiments of the invention can be expressed in many different ways and should not be construed as being limited to the embodiments described herein. Rather, these exemplary embodiments are provided so that this invention will be comprehensive and complete, and will fully convey the scope of the invention to those skilled in the art. Furthermore, as used in the description and the appended claims, the singular forms "a," "an," and "the" are inclusive of their plural forms, unless the context clearly indicates otherwise.

Also, exemplary embodiments are provided so that this description is complete and exemplifies the scope to those skilled in the art. Numerous specific details, such as component examples, and specific methods, are set forth to provide a complete understanding of the embodiments of the present invention. It will also be apparent to those skilled in the art that no specific details are needed, that the exemplary embodiments can be realized in many different ways, and that they should not be construed as limiting the scope of the invention. In some exemplary embodiments, well-known processes, well-known device structures, and well-known technologies are not described in detail.

As used herein, the term "compositions" is intended to encompass products that comprise the specified compounds in the specified amounts, as well as any product that results, directly or indirectly, from a combination of the specified compounds in the specified amounts.

The different aspects of the present invention relate to ophthalmic pharmaceutical compositions in the form of oil-in-water (O/W) nanoemulsions comprising xantophylls, e.g. lutein, present in the form of a mixture of lutein and castor oil.

According to one aspect, the active ingredient, i.e., the xantophyll compound, is in the form of an extract of the possible specific xanthophylls. Preferably in the form of an oily extract of the xanthophyll that can have a concentration of 0.001%-20% w/v. Likewise, the compositions of the present invention comprise pharmaceutically suitable excipients.

In a first embodiment, the compositions of the present invention may contain from 0.4 µg/mL to 100.0 µg/mL, more preferably 0.4, 1.0, 4.0, 12.0, 40.0, 60.0 and 80.0 µg/mL of xanthophyll extract.

In another embodiment, the xanthophyll concentrations can be from 0.00004 µg/mL to 20.0 µg/mL, more preferably 0.08, 0.20, 0.80, 2.4, 8.0, 12.0, 16.0 µg/mL of xanthophyll in the composition.

Preferably, the xanthophyll compound for the purposes of the present invention is selected from the group comprising Flavoxanthin; Lutein; Cryptoxanthin; Rubixanthin; Violaxanthin; Rhodoxanthin; Cantaxanthin; Zeaxanthin; Astaxanthin; Chlorophyll; and/or any other oxygenated derivative of carotenoids; including any mixture thereof, salts or mixtures of salts, isomers and mixtures of isomers.

In a preferred embodiment, the ophthalmic compositions are essentially homogeneous, sterile, isotonic nanoemulsions containing polyols, such as propylene glycol and polymers, such as sodium hyaluronate and chondroitin sulfate, and fatty acids, such as 1,2-dimyristoyl sn-glycero-3-phosphatidylcholine or dimyristyl phosphatidyl choline (DMPC) and castor oil, all pharmaceutical grade. Polymers in some embodiments are mechanically fragmented polymers; or blends of full-chain polymers with fully or partially fragmented polymers (monomers) or partially (dimers, trimers, etc.) to any degree.

In the context of the present invention, propylene glycol is a colorless, tasteless and odorless organic compound (an alcohol, more precisely a diol) that promotes lubrication at the ocular surface level by stabilizing the tear film and decreasing the evaporation of the tear film.

The DMPC compound is a phospholipid (fatty acid) which occurs as an amphiphilic molecule, which is a structural part of the lipid bilayer of the cell membrane.

Contrary to what is described in the prior art, it has been found that DMPC plays a relevant role in the effectiveness of the compositions of the present disclosure, since the net electrical charge of the particles in the nanoemulsion being negative in the particular systems of the present invention, it allows its interaction with the lipid layer of the tear film, increasing its stability and also ensuring the optimal accommodation of the xanthophylls in this same layer; which allows the xanthophylls to act effectively as a filter towards blue light by allowing a longer residence time without the need to use viscosity increasing agents or gel formers.

Among the strategies usually studied to increase the transport of drugs via the eye, are the generation of gels in situ as well as the formulation of positively charged nanoparticles. The first strategy decreases the drug elimination by increasing its retention in the gel formed on the ocular surface, while the second strategy favors the interaction of the positively charged nanoparticles with the corneal surface due to the attraction of their charges. The objective of both strategies is to increase the bioavailability of the drug to the inner layers of the eye by increasing the amount of it that manages to penetrate the corneal surface.

Contrary to these strategies, the nanoparticles reported in this document have a high negative charge demonstrated by their zeta potential. A zeta potential greater than or equal to |±30 mV| allows a high stability of the formulation because the strong repulsion between the nanoparticles reduces the probability of flocculation in the formulation, therefore it remains stable.

When these particles are placed on the ocular surface, they experience a repulsion with the negative charge naturally present in the corneal epithelium due to the phospholipids of the cell lipid bilayer and the presence of mucins. Therefore, the lipid nanoparticles reported here, and consequently the xantophyll encapsulated in them, will remain mainly on the ocular surface and their transport through the cornea will not be favored. This phenomenon supports the finding that the retention time of lutein increases when DMPC is present in the formulation, and thus, lutein is encapsulated in lipid nanoparticles with a net negative charge.

It was found during the development of the present invention that the combination, for example, of castor oil and DM PC, contributes to the thickening of the tear film, as well as to its stability; therefore, lutein, which is hydrophobic in nature, is directly benefited from this phenomenon. Thus, the results found with the formulation containing xantophyll and DMPC show that xantophyll manages to remain in the tear film for a longer time compared to the formulation that does not contain DMPC.

The presence of DM PC in nanoemulsion with a xantophyll in oil increases the residence time of the xantophyll on the ocular surface by two probable mechanisms: 1) the thickening and increased stability of the tear film, and 2) the repulsion with the corneal surface of lipid nanoparticles which are negatively charged.

The oil that accompanies the xanthophyll, which in some embodiments is castor oil, acts as a co-solvent agent, providing the incorporation of a surfactant into the nanoemulsion, also integrates into the system (or emulsion) the lipidic compounds present in the formulation, e.g., fatty acids. In the same way, this component constitutes the oily phase of the present oil-in-water (O/W) nanoemulsion.

In further embodiments, the oil that accompanies the xanthophyll is an ophthalmic acceptable oil, e.g. mineral oils or vegetable oils, selected from the group consisting of lanolin oil, mineral oil, peanut oil, castor oil, polyoxyl 35 castor oil and polyoxyl 40 hydrogenated castor oil.

The different elements included in the ophthalmic compositions of the present invention are present in the following amounts according to their different embodiments:

Diol 0.1-0.6%
Buffering agents 0.01-0.5%
Phospholipid 0.001-0.01%
Chelating agent 0.01-0.1%
Fragmented polymer 0.1-0.5%
Xanthophyll-containing oil 1.0-5.0%
Surfactant 0.2-4.0%
Osmotic agent 0.5-2.2%
Water for injection q.s.

According to the different embodiments, the compounds/elements included in the compositions of the present invention are selected from the group consisting of, but not limited to:

Diols: polyethylene glycol, propylene glycol (e.g. 1,2-propylene glycol and 1,3-propylene glycol), sorbitol, derivatives thereof, and any combination thereof.

Buffering agents: acetate, acetic acid, ascorbate, borate, boric acid, sodium citrate, citric acid, monobasic and dibasic phosphates, pharmaceutically acceptable derivatives thereof, and any combination thereof.

Phospholipids: phosphatidylglycerols, phosphatidylinositols, diphosphatidylglycerols, phosphatidyl sugars, phosphatididylcholines such as dimyristoyl phosphatidylcholine (DMPC), dipalmitoyl phosphatidylcholine (DPPC), phosphatidylethanolamines, L-α-dipalmitoylphosphatidylcholine, sphingomyelin, 1,2-Dimyristoyl-sn-glycero-3-phosphorylglycerol sodium salt (DMPG), derivatives thereof, and any combination thereof.

Chelating agents: EDTA (ethylendiamine tetraacetic acid) itself as well to its various salts, e.g. to monosodium, disodium and/or potassium salt), aminocarboxylic acids, aminoalcohols, and polymeric chelating agents, salts, derivatives thereof and any combination thereof.

Polymers: polysaccharides, polycarbophil, hyaluronic acid, guar gum, chondroitin sulfate, carboxymethylcellulose sodium, derivatives thereof, salts, and any combination thereof.

Surfactants: fatty alcohol esters, fatty acid esters, polyoxyethylene sorbitan fatty acid esters (e.g., polyoxyethylene (20) sorbitan monooleate (Tween 80), polyoxyethylene (20) sorbitan monostearate (Tween 60), polyoxyethylene (20) sorbitan monolaurate (Tween 20) and other Tweens, sorbitan esters, glycerol esters, polyethylene glycols, cetyl alcohol, calcium carboxymethylcellulose, sodium carboxymethylcellulose, polyoxyethylene castor oil, derivatives thereof, and any combination thereof.

Fatty acid and oils: single or in a mixture including mineral oil, castor oil, lanolin oil, peanut oil, polyoxyl 35 castor oil, polyoxyl 40 hydrogenated castor oil, polyoxyethylene sorbitan fatty acid ester, omega-3 fatty acid-containing oil, C14-C20 fatty acid esters can be lauric acid, myristic acid, palmitic acid, palmitoleic acid, stearic acid, oleic acid, linoleic acid, α-linolenic acid, γ-linolenic acid, eicosapentaenoic acid, ethyl oleate, isopropyl myristate, ricinoleic acid; C6-C12 fatty acid esters of glycerol can be fatty acid ester glycerides, caprylic acid-capric acid triglycerides such as caprylic acid-capric acid-linoleic acid triglycerides (e.g. miglyol 818), derivatives thereof and any combination thereof.

In the context of the present invention, the mixture of these components is subjected to homogenization by physical method (high energy emulsification) to obtain the emulsion.

The manufacturing process is carried out considering that the pharmaceutical form is an emulsion, likewise, the characteristics of the components of the formula and the route of administration of the product (ophthalmic) are taken into account. The process seeks to obtain a stable homogeneous emulsion.

In a particular aspect, the processes used comprise a high impact emulsification step, which results in the fragmentation of the polymers into dispersed monomers, thus contributing to the active principle reaching its effectiveness more quickly.

It should be noted that, in view of the preferred route of administration, a sterile product is required, according to the characteristics of the formula developed and the type of primary packaging, it is possible to apply terminal sterilization to the product. For this reason, a sterilization of the product by means of filtration is included, placing this filtered product in a sterile container-closure system, in a sterile environment.

Thus, the mixture of the active principle and the excipients is subjected to a homogenization by physical method (high energy emulsion) to obtain the nanoemulsion. Derived from this process, in the present invention the micelle formed by the fatty acids or phospholipids has a particle size distribution ranging from about 30 nm to about 260 nm; more preferably a particle size distribution ranging from about 32 nm to about 255 nm. In a more preferred embodiment, the composition of the present invention has a particle size distribution of about 100 nm to about 125 nm.

In a preferred embodiment, the process carried out in the present invention consists essentially of three formulation steps.

In a first step, a preliminary mixture of the xanthophyll extract in oil is carried out.

In the second formulation step, a stainless steel tank is used in which the preparation is carried out, starting with the addition of between 60 and 65% of water for the manufacture of injectables to the tank with a temperature in the order of 20 at 30° C. and a constant stirring is applied inside the tank, in which the following components are added, maintaining a constant stirring and temperature range: Polysorbate 80, dimyristoyl phosphatadyl choline (DMPC), boric acid, borate of sodium decahydrate, edetate disodium dihydrate, glycerin, propylene glycol, sodium hyaluronate, and finally the mixture of xanthophyll in oil is added, this mixture being the oily phase of the system or emulsion (O/W).

At this point, water for injection is added to this oily-aqueous preparation mixture, in the necessary quantity to reach the predetermined capacity or volume, being subjected to a homogenization prior to the emulsification of this mixture.

In the third stage, this oil-aqueous mixture of preparations is subjected to a mechanical emulsification process. This emulsification must be carried out under controlled pressure and temperature. Thus, the mixture is subjected to a 60-minute homogenization process and finally to a mechanical emulsification process of at least three cycles at a pressure in a pressure range of 10,000 psi to 30,000 psi, thus obtaining a homogenization of both phases of the emulsion.

During the formulation process, it is ensured that the stirring speed is within the range of 78 rpm-840 rpm, which generates a turbulence-free flow inside the tank when solubilizing the raw materials, incorporating air into the emulsion, and for this reason the homogenization speed must be controlled before the emulsification process in the equipment.

Finally, a sterilization step by filtration is carried out using two sterilizing membranes, preferably polyethylsulfone membranes, with a pore size of 0.2 µm. The filters used are subjected to a membrane integrity test as a control.

In a preferred embodiment, the above-listed compounds are included in their respective proportions, taking care that the number of stirring revolutions is in a range of 78 rpm-840 rpm.

In another aspect, the present invention relates to methods and use of ophthalmic pharmaceutical compositions in the treatment of blue light visual fatigue, digital visual fatigue, dry eye, as well as in the improvement of the sleep cycle in a subject by preventing the decrease in melatonin, through protecting and blocking blue light from any light source.

In a further embodiment, the compositions of the present invention have minimal alteration in scotopic sensitivity. An adverse effect of the use of blue light filters is to modify scotopic sensitivity, that is, the ability to distinguish colors, especially when there is low light, for example, in dark spaces or at night. Therefore, it is desirable that the change in this sensitivity remains with minimal alteration.

In connection with the above, a study by Leung et al (2017), reported the theoretical changes in relative phototoxicity, inhibition of melatonin suppression and scotopic sensitivity of five different brands of contact lenses with blue light filter, concluding that increased relative phototoxicity protection and inhibition of melatonin suppression are desirable effects of the use of blue light filters: the higher the percentage, the greater the protection exerted by the device used.

Moreover, Leung et al demonstrated that scotopic sensitivity reduction in the range of 2.4% to 9.6% was not detected by more than 70% of the users who participated in their study. Therefore, a reduction in scotopic sensitivity between 9%-10% does not produce a clinically significant risk or effect when using devices to block the level of ocular exposure to blue light. Comparative experimental tests were carried out based on the compositions of the present invention, the results are detailed in the following examples.

In another aspect of the present invention, it is provided a pharmaceutical system that allows to contain the compositions of the present invention and for administration thereof.

One aspect of the container system includes the compositions of the present invention as described above.

Moreover, in an exemplary embodiment, the pharmaceutical system also includes containers made of low-density polyethylene with a locking device of high-density polyethylene, assembled, which have a silicone and low-density polyethylene valve system. Furthermore, the container system is compatible with a wide range of viscosities, thus it is easy to use and requires little force to operate an action of function mechanism.

The mechanism of this multi-dose container system consists of dosing the compositions of the present invention inside the container, preventing the entry of air and/or preventing the product becomes contaminated from the outside by means of a non-return valve, compensating the internal air by means of a valve vent that filters the intake of contaminated air, and preventing the entry of contaminated liquids from the outside.

In a further aspect, the container system provides all necessary components for the administration of the compositions of the present invention in a safe and convenient manner. Thus, the compositions of the present invention are maintained sterile without the need of additives, such as antimicrobial and bacteriostatic compounds.

Below are some examples to demonstrate the various embodiments and advantages of the present invention, including the best mode, and also to enable any person skilled in the art to practice the various embodiments of the invention, including the manufacture and use of the composition and the execution of any embodiment. The patentable scope of the various embodiments of the invention is defined by the claims and may include other examples that may occur to those skilled in the art. Such other examples are intended to be within the scope of the claims.

EXAMPLES

Example 1. Manufacturing Process for the Compositions of the Present Invention

The process comprises the following steps:
a) adding 60-65% of water for injection in a stainless-steel tank, at a temperature of 20-30° C.;
b) stirring continuously while adding a surfactant, DMPC, boric acid, sodium borate decahydrate, disodium edetate dihydrate, glycerin, propylene glycol, sodium hyaluronate and a castor oil containing a xanthophyll;
c) carrying out a mechanical emulsification process until a completely homogeneous product is obtained;
d) sterilizing the emulsion by filtration using sterilizing membranes with pore size of 0.2 μm;

and wherein the resulting mixture is subjected to a 60-minute homogenization process and a mechanical emulsification process of at least three cycles in a pressure range of 10,000 psi (68'947,591 Pa) to 30,000 psi (206'842,773 Pa).

TABLE 1

Order of addition of components

| Concentration | Compound | Classification |
|---|---|---|
| 0.75% | Polysorbate | Surfactant |
| 0.005% | DMPC | Phospholipid |
| 0.1% | Boric acid | Buffering agent |
| 0.032% | Sodium borate | Buffering agent |
| 0.02% | Disodium edetate | Chelating agent |
| 1.66% | Glycerine | Osmotic agent |
| 0.6% | Propylene glycol | Diol |
| 0.1% | Sodium hyaluronate | Fragmented Polymer |
| 0.00004% (Eq. to 0.4 μg/mL)-0.004% (Eq. to 40 μg/mL) | Xanthophyll extract | Xanthophyll |
| ~0.996% | Castor oil | Oil |

Example 2. Stability of the Compositions Containing Lutein and DPMC

Methods

Four formulations containing 0.0, 0.4, 4.0 and 40.0 μg/mL of lutein extract were stored at 50° C. and 60° C., respectively, for 7 days. The physicochemical stability was evaluated by measuring their particle size (Z-Average), polydispersity index (PDI), zeta potential and electrophoretic mobility.

TABLE 2

Composition stability at concentrations of 0.0, 0.4, 4.0 and 40.0 μg/mL of lutein extract with DP MC

| Lutein extract concentration | Condition | Z-Ave (d · nm) | PDI | Z Potential (mV) | Mobility (μmcm/Vs) |
|---|---|---|---|---|---|
| 0.0 μg/mL | 0 days | 109.50 ± 0.20 | 0.20 ± 0.02 | −28.10 ± 0.70 | −1.26 ± 0.03 |
| | 7 days, 50° C. | 108.70 ± 0.81 | 0.20 ± 0.01 | −25.10 ± 0.62 | −1.13 ± 0.03 |
| | 7 days, 60° C. | 108.50 ± 2.21 | 0.19 ± 0.02 | −25.03 ± 0.55 | −1.12 ± 0.02 |
| 0.4 μg/mL | 0 days | 118.20 ± 0.51 | 0.19 ± 0.01 | −30.57 ± 0.45 | −1.37 ± 0.02 |
| | 7 days, 50° C. | 117.30 ± 0.80 | 0.19 ± 0.02 | −26.47 ± 0.75 | −1.19 ± 0.03 |
| | 7 days, 60° C. | 115.60 ± 1.35 | 0.20 ± 0.02 | −27.57 ± 0.85 | −1.24 ± 0.04 |
| 4.0 μg/mL | 0 days | 118.90 ± 1.59 | 0.20 ± 0.02 | −28.07 ± 1.19 | −1.26 ± 0.05 |
| | 7 days, 50° C. | 119.70 ± 1.08 | 0.19 ± 0.02 | −25.53 ± 1.15 | −1.15 ± 0.01 |
| | 7 days, 60° C. | 118.60 ± 0.38 | 0.19 ± 0.01 | −23.87 ± 0.38 | −1.07 ± 0.02 |
| 40.0 μg/mL | 0 days | 122.00 ± 1.28 | 0.21 ± 0.01 | −27.47 ± 0.42 | −1.23 ± 0.02 |
| | 7 days, 50° C. | 120.50 ± 1.46 | 0.21 ± 0.01 | −24.33 ± 0.51 | −1.09 ± 0.02 |
| | 7 days, 60° C. | 120.30 ± 1.37 | 0.19 ± 0.00 | −25.13 ± 0.74 | −1.13 ± 0.03 |

The results presented in Table 2 show that size of the particles in the nanoemulsion increases slightly when it is filled with the xanthophyll extract at the different concentrations at 0 days; in the absence of xanthophyll, that is, in the 0.0 µg/mL formulation, the micelles only contain the oil and the phospholipid, therefore, it coincides with the smallest particle size presented in this table at day 0. All formulations have a particle size within the range of 100 nm to 125 nm at day 0.

This slight difference in particle size does not have any implication on other physicochemical parameters of the nanoemulsion at day 0, such as the polydispersity index, the zeta potential and the electrophoretic mobility.

Table 2 shows that even containing the xanthophyll extract, the formulation has a monodisperse size distribution given by its PDI values less than 0.5. Furthermore, the zeta potential of the formulations with and without lutein is close to |30 mV|, which indicates a high stability of the formulation.

After subjecting the formulations for 7 days to the stress conditions of 40° C. to 60° C., it was found that all the parameters remain constant in the formulations or with slight variations. Therefore, the results presented here demonstrate that the nanoemulsion itself is stable and that the addition of xanthophyll does not modify this stability.

Example 3. Stability of the Compositions Containing Lutein and DPMG

Methods

Four formulations containing 0.0, 0.4, 4.0 and 40.0 µg/mL of lutein extract were kept at 50° C. and 60° C. for 7 days. The physicochemical stability was evaluated by measuring their particle size (Z-Average), polydispersity index (PDI), zeta potential and electrophoretic mobility.

The results in Table 3 show no increase in particle size, even at the highest concentration of lutein. All formulations have a particle size within the range of 100 nm to 125 nm at day 0.

Table 3 shows that even containing the xanthophyll extract, the formulation has a monodisperse size distribution given by the PDI values less than 0.5. Furthermore, the zeta potential of the formulations with and without lutein is close to |30 mV|, which indicates a high stability of the formulation.

After subjecting the formulations for 7 days to the stress conditions of 50° C. and 60° C., it was found that all the parameters remain constant in the formulations or with slight variations. Therefore, the results presented here demonstrate that the nanoemulsion formulated with DMPG phospholipid is stable and that the addition of xanthophyll does not modify this stability.

Example 4. Stability of the Compositions Containing Astaxanthin and DMPC

Methods

Four formulations containing 0.0, 0.4, 4.0 and 40.0 µg/mL of astaxanthin extract were kept at 50° C. and 60° C. for 7 days. The physicochemical stability was evaluated by measuring their particle size (Z-Average), polydispersity index (PDI), zeta potential and electrophoretic mobility.

TABLE 3

Composition stability at concentrations of 0.0, 0.4, 4.0 and 40.0 µg/mL of lutein extract with DPMG

| Lutein extract concentration | Condition | Z-Ave (d · nm) | PDI | Z Potential (mV) | Mobility (µmcm/Vs) |
| --- | --- | --- | --- | --- | --- |
| 0.0 µg/mL | 0 days | 116.40 ± 0.21 | 0.21 ± 0.01 | −33.47 ± 0.15 | −1.30 ± 0.03 |
| | 7 days, 50° C. | 120.30 ± 2.23 | 0.22 ± 0.01 | −31.07 ± 0.42 | −1.26 ± 0.02 |
| | 7 days, 60° C. | 119.40 ± 1.78 | 0.19 ± 0.03 | −30.87 ± 1.35 | −1.23 ± 0.05 |
| 0.4 µg/mL | 0 days | 112.20 ± 0.67 | 0.21 ± 0.02 | −33.87 ± 0.80 | −1.29 ± 0.03 |
| | 7 days, 50° C. | 115.30 ± 1.68 | 0.20 ± 0.02 | −32.60 ± 0.95 | −1.28 ± 0.04 |
| | 7 days, 60° C. | 117.10 ± 0.45 | 0.20 ± 0.03 | −31.87 ± 1.34 | −1.25 ± 0.05 |
| 4.0 µg/mL | 0 days | 115.50 ± 1.71 | 0.21 ± 0.01 | −32.73 ± 1.46 | −1.29 ± 0.06 |
| | 7 days, 50° C. | 118.50 ± 1.53 | 0.21 ± 0.01 | −32.27 ± 1.50 | −1.29 ± 0.06 |
| | 7 days, 60° C. | 115.70 ± 0.67 | 0.19 ± 0.00 | −30.13 ± 1.16 | −1.18 ± 0.04 |
| 40.0 µg/mL | 0 days | 118.60 ± 0.25 | 0.20 ± 0.01 | −32.53 ± 1.06 | −1.32 ± 0.04 |
| | 7 days, 50° C. | 117.20 ± 0.25 | 0.22 ± 0.02 | −29.97 ± 0.38 | −1.22 ± 0.02 |
| | 7 days, 60° C. | 118.00 ± 1.46 | 0.20 ± 0.01 | −30.63 ± 1.12 | −1.25 ± 0.05 |

TABLE 4

Composition stability at concentrations of 0.0, 0.4, 4.0 and 40.0 µg/mL of astaxanthin extract with DPMC

| Astaxanthin extract concentration | Condition | Z-Ave (d · nm) | PDI | Z Potential (mV) | Mobility (µmcm/Vs) |
|---|---|---|---|---|---|
| 0.0 µg/mL | 0 days | 109.50 ± 0.20 | 0.20 ± 0.02 | −28.10 ± 0.70 | −1.26 ± 0.03 |
| | 7 days, 50° C. | 108.70 ± 0.81 | 0.20 ± 0.01 | −25.10 ± 0.62 | −1.13 ± 0.03 |
| | 7 days, 60° C. | 108.50 ± 2.21 | 0.19 ± 0.02 | −25.03 ± 0.55 | −1.12 ± 0.02 |
| 0.4 µg/mL | 0 days | 116.60 ± 1.01 | 0.20 ± 0.01 | −28.13 ± 1.33 | −1.17 ± 0.05 |
| | 7 days, 50° C. | 109.80 ± 0.92 | 0.21 ± 0.02 | −25.83 ± 0.65 | −1.04 ± 0.03 |
| | 7 days, 60° C. | 109.80 ± 0.86 | 0.21 ± 0.01 | −27.20 ± 0.32 | −1.10 ± 0.01 |
| 4.0 µg/mL | 0 days | 108.80 ± 1.01 | 0.19 ± 0.00 | −30.90 ± 0.72 | −1.24 ± 0.03 |
| | 7 days, 50° C. | 102.40 ± 1.46 | 0.21 ± 0.01 | −28.78 ± 0.41 | −0.85 ± 0.49 |
| | 7 days, 60° C. | 105.50 ± 0.59 | 0.19 ± 0.01 | −26.63 ± 0.46 | −1.06 ± 0.02 |
| 40.0 µg/mL | 0 days | 114.30 ± 0.48 | 0.21 ± 0.01 | −29.50 ± 1.30 | −1.19 ± 0.05 |
| | 7 days, 50° C. | 106.10 ± 1.03 | 0.22 ± 0.01 | −29.10 ± 1.34 | −1.12 ± 0.05 |
| | 7 days, 60° C. | 105.80 ± 0.83 | 0.20 ± 0.01 | −27.88 ± 0.83 | −1.14 ± 0.11 |

The results presented in Table 4 show a slight increase in particle size, when adding different concentrations of astaxanthin. All formulations have a particle size within the range of 100 nm to 125 nm at day 0.

Table 4 shows that even containing the xanthophyll extract, the formulation has a monodisperse size distribution given by its PDI values less than 0.5. Furthermore, the zeta potential of the formulations with and without astaxanthin is close to |30 mV|, which indicates a high stability of the formulation.

After subjecting the formulations for 7 days to the stress conditions of 50° C. and 60° C., it was found that all the parameters remain constant in the formulations or with slight variations.

Therefore, the results presented here demonstrate that the nanoemulsion formulated with DMPC phospholipid is stable and that the addition of xanthophyll does not modify this stability.

Example 5. Stability of the Compositions Containing Astaxanthin and DPMG

Methods

Four formulations containing 0.0, 0.4, 4.0 and 40.0 µg/mL of astaxanthin extract were kept at 50° C. and 60° C. for 7 days. The physicochemical stability was evaluated by measuring their particle size (Z-Average), polydispersity index (PDI), zeta potential and electrophoretic mobility.

TABLE 5

Composition stability at concentrations of 0.0, 0.4, 4.0 and 40.0 µg/mL of astaxanthin extract with DPMG

| Astaxanthin extract concentration | Condition | Z-Ave (d · nm) | PDI | Z Potential (mV) | Mobility (µmcm/Vs) |
|---|---|---|---|---|---|
| 0.0 µg/mL | 0 days | 116.40 ± 0.21 | 0.21 ± 0.01 | −33.47 ± 0.15 | −1.30 ± 0.03 |
| | 7 days, 50° C. | 120.30 ± 2.23 | 0.22 ± 0.01 | −31.07 ± 0.42 | −1.26 ± 0.02 |
| | 7 days, 60° C. | 119.40 ± 1.78 | 0.19 ± 0.03 | −30.87 ± 1.35 | −1.23 ± 0.05 |
| 0.4 µg/mL | 0 days | 116.40 ± 1.35 | 0.22 ± 0.00 | −33.00 ± 0.96 | −1.33 ± 0.04 |
| | 7 days, 50° C. | 116.90 ± 2.46 | 0.24 ± 0.02 | −32.07 ± 0.42 | −1.28 ± 0.02 |
| | 7 days, 60° C. | 117.40 ± 0.62 | 0.21 ± 0.03 | −31.37 ± 0.70 | −1.25 ± 0.03 |
| 4.0 µg/mL | 0 days | 114.40 ± 0.59 | 0.19 ± 0.03 | −31.10 ± 0.66 | −1.26 ± 0.03 |
| | 7 days, 50° C. | 116.20 ± 0.40 | 0.18 ± 0.03 | −30.60 ± 0.66 | −1.27 ± 0.03 |
| | 7 days, 60° C. | 123.70 ± 0.57 | 0.20 ± 0.01 | −27.50 ± 0.36 | −1.17 ± 0.01 |
| 40.0 µg/mL | 0 days | 117.00 ± 1.07 | 0.20 ± 0.00 | −31.20 ± 1.06 | −1.27 ± 0.04 |
| | 7 days, 50° C. | 118.80 ± 2.28 | 0.21 ± 0.02 | −31.63 ± 0.87 | −1.29 ± 0.03 |
| | 7 days, 60° C. | 119.80 ± 1.21 | 0.20 ± 0.01 | −30.90 ± 0.20 | −1.25 ± 0.01 |

The results presented in Table 5 show no increase in particle size, even at the highest concentration of astaxanthin. All formulations have a particle size within the range of 100 nm to 125 nm at day 0.

Table 5 shows that even containing the xanthophyll extract, the formulation has a monodisperse size distribution given by its PDI values less than 0.5. Furthermore, the zeta potential of the formulations with and without astaxanthin is close to |30 mV|, which indicates a high stability of the formulation.

After subjecting the formulations for 7 days to the stress conditions of 50° C. and 60° C., it was found that all the parameters remain constant in the formulations or with slight variations. Therefore, the results presented here demonstrate that the nanoemulsion formulated with DMPG phospholipid is stable and that the addition of xanthophyll does not modify this stability.

Example 6. Stability of the Compositions Containing Zeaxanthin and DPMC

Methods

Four formulations containing 0.0, 0.4, 4.0 and 40.0 µg/mL of zeaxanthin extract were kept at 50° C. and 60° C. for 7 days. The physicochemical stability was evaluated by measuring their particle size (Z-Average), polydispersity index (PDI), zeta potential and electrophoretic mobility.

The results presented in Table 6 show a slight increase in particle size, when adding different concentrations of zeaxanthin. All formulations have a particle size within the range of 100 nm to 125 nm at day 0.

Table 6 shows that even containing the xanthophyll extract, the formulation has a monodisperse size distribution given by its PDI values less than 0.5. Furthermore, the zeta potential of the formulations with and without zeaxanthin is between |25 mV| and |30 mV|, which indicate a high stability of the formulation.

After subjecting the formulations for 7 days to the stress conditions of 50° C. and 60° C., it was found that all the parameters remain constant in the formulations or with slight variations. Therefore, the results presented here demonstrate that the nanoemulsion formulated with DMPC phospholipid is stable and that the addition of xanthophyll does not modify this stability.

Example 7. Stability of the Compositions Containing Zeaxanthin and DPMG

Methods

Four formulations containing 0.0, 0.4, 4.0 and 40.0 µg/mL of zeaxanthin extract were kept at 50° C. and 60° C. for 7 days. The physicochemical stability was evaluated by measuring their particle size (Z-Average), polydispersity index (PDI), zeta potential and electrophoretic mobility.

TABLE 6

Composition stability at concentrations of 0.0, 0.4, 4.0 and 40.0 µg/mL of zeaxanthin extract with DPMC

| Zeaxanthin extract concentration | Condition | Z-Ave (d · nm) | PDI | Z Potential (mV) | Mobility (µmcm/Vs) |
|---|---|---|---|---|---|
| 0.0 µg/mL | 0 days | 109.50 ± 0.20 | 0.20 ± 0.02 | −28.10 ± 0.70 | −1.26 ± 0.03 |
| | 7 days, 50° C. | 108.70 ± 0.81 | 0.20 ± 0.01 | −25.10 ± 0.62 | −1.13 ± 0.03 |
| | 7 days, 60° C. | 108.50 ± 2.21 | 0.19 ± 0.02 | −25.03 ± 0.55 | −1.12 ± 0.02 |
| 0.4 µg/mL | 0 days | 115.40 ± 1.34 | 0.21 ± 0.01 | −28.88 ± 0.39 | −1.18 ± 0.02 |
| | 7 days, 50° C. | 111.40 ± 1.02 | 0.21 ± 0.02 | −29.53 ± 1.05 | −1.14 ± 0.04 |
| | 7 days, 60° C. | 114.20 ± 0.86 | 0.20 ± 0.01 | −26.50 ± 0.43 | −1.06 ± 0.02 |
| 4.0 µg/mL | 0 days | 113.60 ± 1.54 | 0.20 ± 0.01 | −29.10 ± 0.67 | −1.16 ± 0.03 |
| | 7 days, 50° C. | 109.60 ± 0.93 | 0.22 ± 0.01 | −28.83 ± 0.87 | −1.13 ± 0.01 |
| | 7 days, 60° C. | 116.60 ± 1.73 | 0.22 ± 0.02 | −25.85 ± 0.35 | −1.04 ± 0.01 |
| 40.0 µg/mL | 0 days | 114.50 ± 1.06 | 0.22 ± 0.01 | −29.28 ± 0.48 | −1.20 ± 0.02 |
| | 7 days, 50° C. | 109.80 ± 0.42 | 0.21 ± 0.01 | −28.68 ± 0.24 | −1.14 ± 0.01 |
| | 7 days, 60° C. | 103.20 ± 1.01 | 0.21 ± 0.01 | −28.88 ± 0.48 | −1.10 ± 0.02 |

TABLE 7

Composition stability at concentrations of 0.0, 0.4, 4.0 and 40.0 μg/mL of zeaxanthin extract with DPMG

| Zeaxanthin extract concentration | Condition | Z-Ave (d · nm) | PDI | Z Potential (mV) | Mobility (μmcm/Vs) |
|---|---|---|---|---|---|
| 0.0 μg/mL | 0 days | 116.40 ± 0.21 | 0.21 ± 0.01 | −33.47 ± 0.15 | −1.30 ± 0.03 |
|  | 7 days, 50° C. | 120.30 ± 2.23 | 0.22 ± 0.01 | −31.07 ± 0.42 | −1.26 ± 0.02 |
|  | 7 days, 60° C. | 119.40 ± 1.78 | 0.19 ± 0.03 | −30.87 ± 1.35 | −1.23 ± 0.05 |
| 0.4 μg/mL | 0 days | 118.20 ± 0.45 | 0.22 ± 0.01 | −31.97 ± 0.91 | −1.28 ± 0.04 |
|  | 7 days, 50° C. | 122.30 ± 0.06 | 0.22 ± 0.01 | −28.57 ± 1.02 | −1.16 ± 0.04 |
|  | 7 days, 60° C. | 125.10 ± 0.32 | 0.19 ± 0.03 | −27.63 ± 0.35 | −1.14 ± 0.01 |
| 4.0 μg/mL | 0 days | 122.30 ± 0.49 | 0.20 ± 0.03 | −32.67 ± 1.00 | −1.32 ± 0.04 |
|  | 7 days, 50° C. | 124.30 ± 1.79 | 0.23 ± 0.02 | −31.00 ± 0.30 | −1.28 ± 0.01 |
|  | 7 days, 60° C. | 127.40 ± 1.01 | 0.20 ± 0.02 | −27.40 ± 1.30 | −1.11 ± 0.05 |
| 40.0 μg/mL | 0 days | 118.00 ± 1.54 | 0.20 ± 0.04 | −33.10 ± 1.22 | −1.34 ± 0.05 |
|  | 7 days, 50° C. | 120.10 ± 2.26 | 0.21 ± 0.02 | −30.13 ± 0.67 | −1.25 ± 0.03 |
|  | 7 days, 60° C. | 122.00 ± 3.22 | 0.21 ± 0.01 | −28.27 ± 0.72 | −1.18 ± 0.03 |

The results presented in Table 7 show a slight increase in particle size, when adding different concentrations of zeaxanthin. All formulations have a particle size within the range of 100 nm to 125 nm at day 0.

Table 7 shows that even containing the xanthophyll extract, the formulation has a monodisperse size distribution given by its PDI values less than 0.5. Furthermore, the zeta potential of the formulations with and without zeaxanthin is close to |30 mV|, which indicates a high stability of the formulation.

After subjecting the formulations for 7 days to the stress conditions of 50° C. and 60° C., it was found that all the parameters remain constant in the formulations or with slight variations. Therefore, the results presented here demonstrate that the nanoemulsion formulated with DMPG phospholipid is stable and that the addition of xanthophyll does not modify this stability.

Example 8. Relative Phototoxicity, Relative Melatonin Suppression, and Relative Scotopic Sensitivity Tests of the Formulations Containing Lutein, Astaxanthin and Zeaxanthin

Methodology

The transmittance of the formulations with a content of 0.0, 0.4, 4.0 and 40.0 μg/mL of the lutein, astaxanthin and zeaxanthin extract were obtained.

Lutein, Astaxanthin and Zeaxanthin Compositions

A 1:5 dilution of each formulation was made using an organic solvent, then each dilution was placed in a spectrophotometer cuvette 1 cm×1 cm wide and long. The range of transmittance of each dilution was obtained in the range of 380 nm to 600 nm and then the relative phototoxicity (B), the relative suppression of melatonin (C) and the relative scotopic sensitivity (V') of each formulation were calculated with respect to the formulation without lutein, using the following equations:

$$\Delta B = 1 - \frac{\int_{280}^{600} T(\lambda)B(\lambda)d\lambda}{\int_{280}^{600} B(\lambda)d\lambda} \quad [1]$$

$$\Delta C = 1 - \frac{\int_{280}^{600} T(\lambda)C(\lambda)d\lambda}{\int_{280}^{600} C(\lambda)d\lambda} \quad [2]$$

$$\Delta V' = 1 - \frac{\int_{280}^{600} T(\lambda)V'(\lambda)d\lambda}{\int_{280}^{600} V'(\lambda)d\lambda} \quad [3]$$

Where the values $B(\lambda)$, $C(\lambda)$ and $V'(\lambda)$ used for each equation were taken from the international guidelines published by the International Commission on Non-Ionizing Radiation Protection (ICNIRP), the German Institute for Standardization (DIN) and the International Commission on Illumination (CIE), respectively. The results obtained were plotted and their area under the curve was calculated.

8.1. Results of Lutein

FIG. 1 shows the results of the protection provided by the compositions by decreasing the relative phototoxicity exerted by exposure to blue light. The formulation with 0.4 μg/mL of lutein extract exerts a 9.5% protection in relation to the blank (without xanthophyll). In the same way, the formulations with 4.0 μg/mL and 40.0 μg/mL of the extract have protection of 15.4% and 44.0% respectively when compared to blank.

Figure 2:
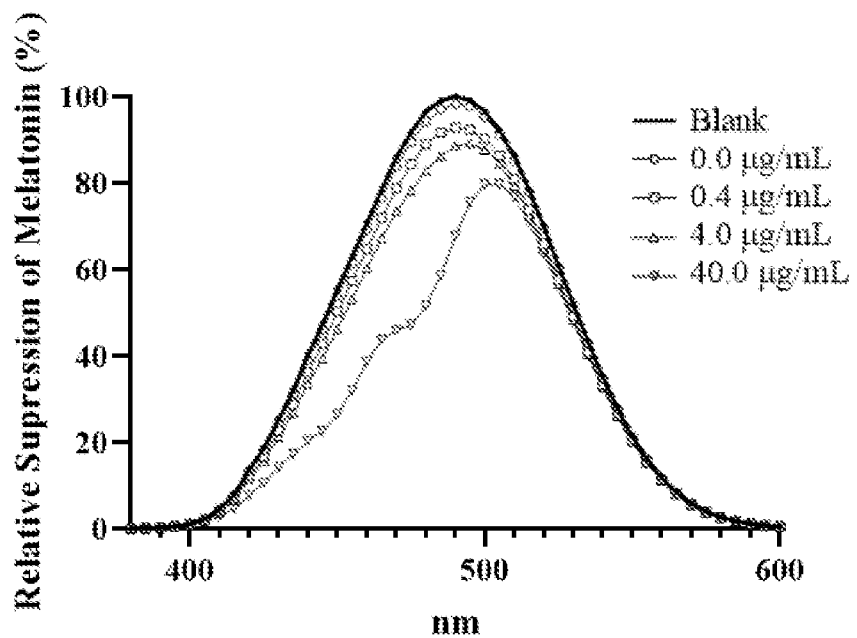
FIG. 2 illustrates the results of the relative inhibition of melatonin by the action of blue light. The results show that the compositions with lutein and DMPC exert protection of between 7.4% and 29.6% in relation to the blank (without lutein).

FIG. 2 depicts the results of the relative inhibition of melatonin by the action of blue light. The results show that the formulations with lutein exert a protection between 7.4% and 29.6% in relation to the blank.

Figure 3:
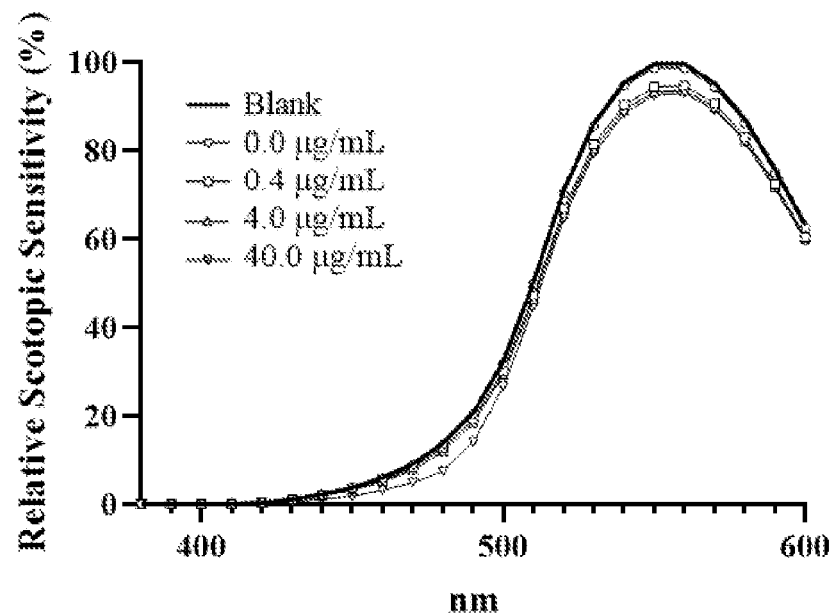
FIG. 3 illustrates the scotopic sensitivity obtained when using the compositions containing Lutein and DMPC of the present invention.

FIG. 3 shows the scotopic sensitivity obtained when using each of the formulations; the range of concentrations used for lutein retains at least 90% of this sensitivity.

The results in Table 8 show the lutein compositions of the present invention have in addition minimal alteration in scotopic sensitivity, compared for example with the use of contact lenses with a blue light filter.

TABLE 8

Comparison of relative protection of the lutein nanoemulsion with reference to the results reported for five brands of contact lenses with blue light filter according to Leung et al

| Compositions of the present invention with Lutein | Phototoxicity | Melatonin suppression | Scotopic sensitivity alteration |
|---|---|---|---|
| 0.0 µg/mL | 2.4% | 1.7% | 1.0% |
| 0.4 µg/mL | 9.5% | 7.4% | 5.4% |
| 4.0 µg/mL | 15.4% | 11.4% | 6.8% |
| 40.0 µg/mL | 44.0% | 29.6% | 9.8% |
| Contact lenses with blue light filter | 10.6-23.6% | 5.8-15.0% | 2.4-9.6% |

The results in Table 8 show the lutein compositions (0.4 y 4.0 µg/mL) offer the same benefits regarding scotopic sensitivity as those obtained using physical barriers, such as contact lenses with a blue light filter. However, composition containing 40.0 µg/mL provides an improved protection in relation to the previous ones.

8.2 Results of Astaxanthin

Figure 4:
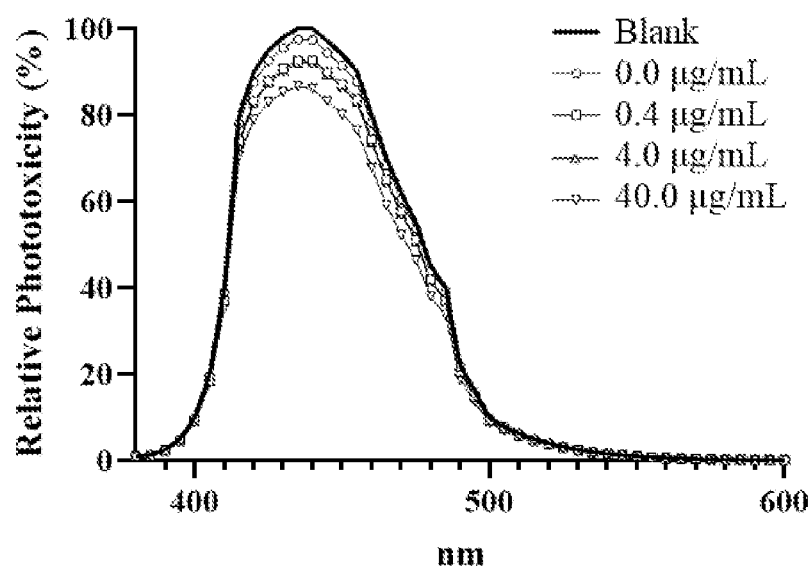
FIG. 4 illustrates the results of the protection provided by the compositions containing Astaxanthin and DM PC, by decreasing the relative phototoxicity exerted by exposure to blue light.

FIG. 4 illustrates the results of the protection provided by the compositions containing astaxanthin, by decreasing the relative phototoxicity exerted by exposure to blue light. The formulation with 0.4 µg/mL of astaxanthin extract exerts 7.3% protection in relation to the blank. In the same way, the formulations with 4.0 µg/mL and 40.0 µg/mL of the extract present a protection of 7.9% and 13.9% respectively when compared to the blank.

Figure 5:
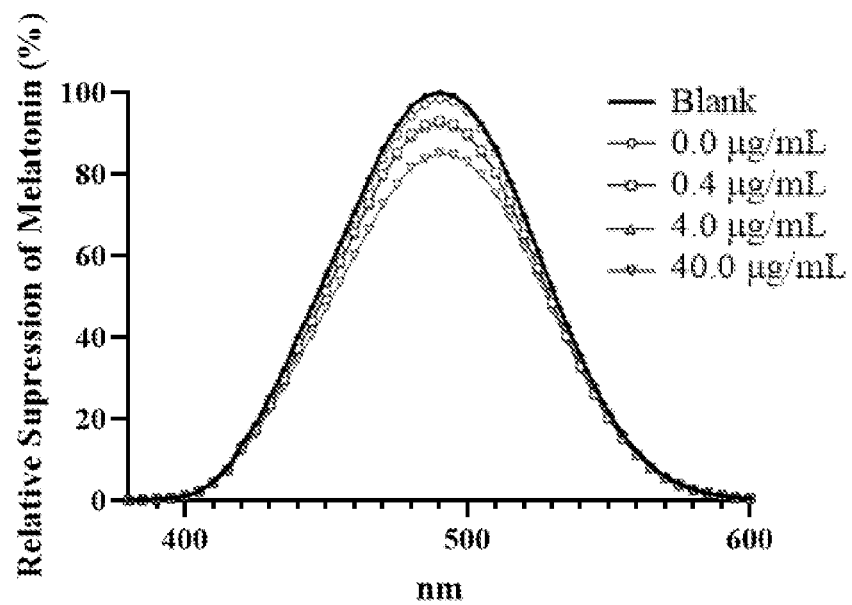
FIG. 5 illustrates the results of the relative inhibition of melatonin by the action of blue light. The results show that the formulations with astaxanthin exert protection of between 7.0% and 13.4% in relation to the blank (without Astaxanthin).

FIG. 5 illustrates the results of the relative inhibition of melatonin by the action of blue light. The results show that the compositions with astaxanthin exert a protection between 7.0% and 13.4% in relation to the blank.

Figure 6:
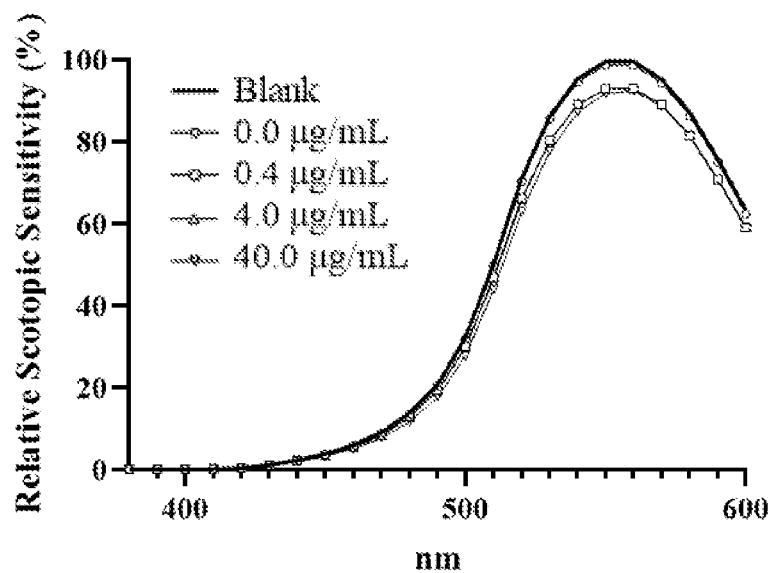
FIG. 6 illustrates the scotopic sensitivity obtained when using the compositions containing Astaxanthin and DM PC of the present invention.

FIG. 6 shows the scotopic sensitivity obtained when using each of the compositions with astaxanthin; the range of concentrations used for astaxanthin retains at least 90% of this sensitivity.

The above-mentioned results are summarized in Table 9. It shows that the blue light protection exerted by the formulations with astaxanthin are similar to those found when using contact lenses with blue light filter.

TABLE 9

Comparison of relative protection of the Astaxanthin nanoemulsion with reference to the results reported for five brands of contact lenses with blue light filter according to Leung et al.

| Compositions of the present invention with Astaxanthin | Phototoxicity | Melatonin suppression | Scotopic sensitivity alteration |
|---|---|---|---|
| 0.0 µg/mL | 2.4% | 1.7% | 1.0% |
| 0.4 µg/mL | 7.3% | 7.0% | 6.6% |
| 4.0 µg/mL | 7.9% | 7.5% | 6.8% |
| 40.0 µg/mL | 13.9% | 13.4% | 8.9% |
| Contact lenses with blue light filter | 10.6-23.6% | 5.8-15.0% | 2.4-9.6% |

8.3 Results of Zeaxanthin

Figure 7:
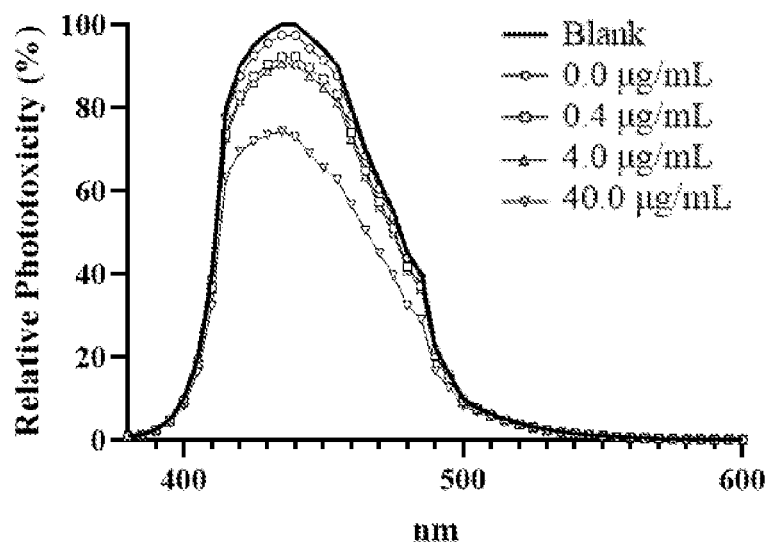
FIG. 7 illustrates the results of the protection provided by the compositions containing Zeaxanthin and DM PC, by decreasing the relative phototoxicity exerted by exposure to blue light.

FIG. 7 illustrates the results of the protection provided by the compositions containing Zeaxanthin, by decreasing the relative phototoxicity exerted by exposure to blue light. The formulation with 0.4 µg/mL of zeaxanthin extract exerts a 7.7% protection in relation to the blank. In the same way, the formulations with 4.0 µg/mL and 40.0 µg/mL of the extract present a protection of 9.3% and 25.7% respectively when compared to the blank.

Figure 8:
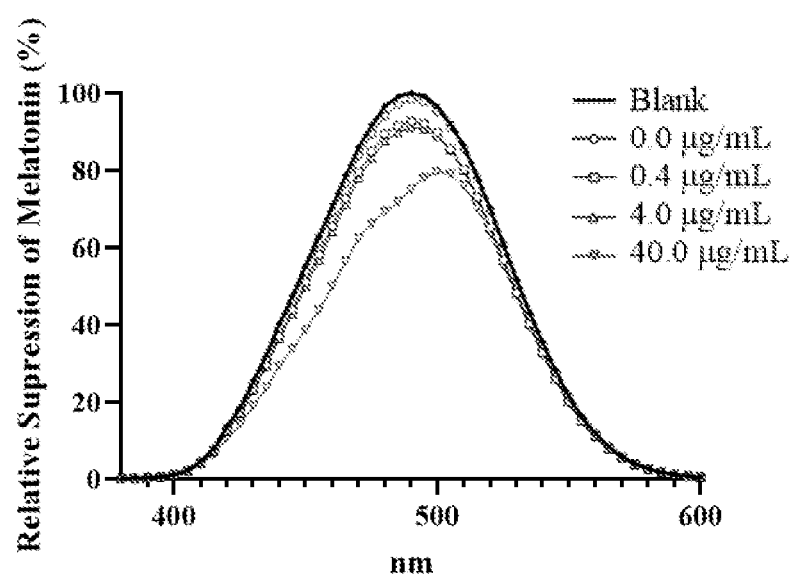
FIG. 8 illustrates the results of the relative inhibition of melatonin by the action of blue light. The results show that the formulations with zeaxanthin exert protection of between 7.2% and 20.5% in relation to the blank (without Zeaxanthin).

FIG. 8 illustrates the results of the relative inhibition of melatonin by the action of blue light. The results show that the formulations with zeaxanthin exert a protection of between 7.2% and 20.5% in relation to the blank.

Figure 9:
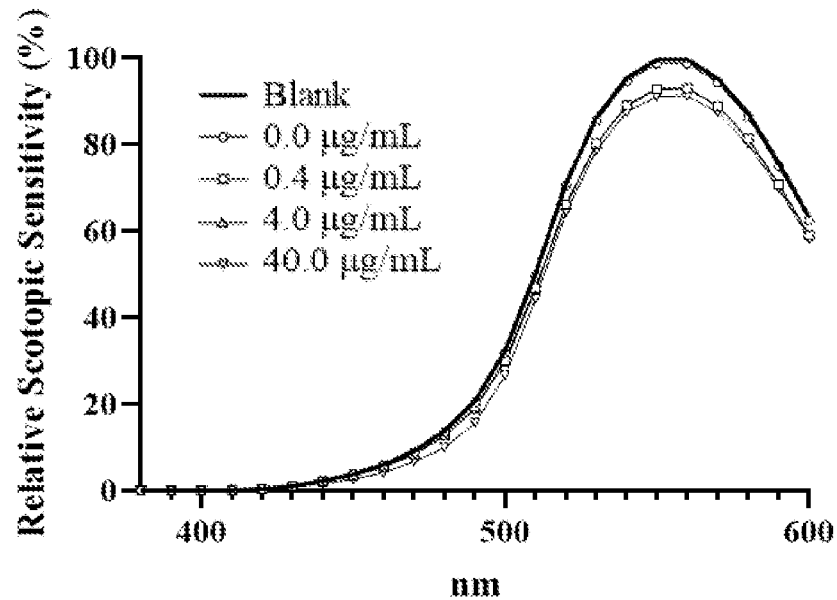
FIG. 9 illustrates the scotopic sensitivity obtained when using the compositions containing Zeaxanthin and DMPC of the present invention.

FIG. 9 shows the scotopic sensitivity obtained when using each of the formulations; the range of concentrations used for zeaxanthin retains at least 89.9% of this sensitivity.

The above-mentioned results are summarized in Table 10. It shows that the blue light protection exerted by the formulations with zeaxanthin are similar to those found when using contact lenses with blue light filter.

TABLE 10

Comparison of relative protection of the Zeaxanthin nanoemulsion with reference to the results reported for five brands of contact lenses with blue light filter according to Leung et

| Compositions of the present invention with Zeaxanthin | Phototoxicity | Melatonin suppression | Scotopic sensitivity alteration |
|---|---|---|---|
| 0.0 µg/mL | 2.4% | 1.7% | 1.0% |
| 0.4 µg/mL | 7.7% | 7.2% | 6.8% |
| 4.0 µg/mL | 9.3% | 8.4% | 6.9% |
| 40.0 µg/mL | 25.7% | 20.5% | 10.1% |
| Contact lenses with blue light filter | 10.6-23.6% | 5.8-15.0% | 2.4-9.6% |

Example 9. Residence of Xanthophylls on the Ocular Surface

Methodology

A) Approximately 50 µL of a formulation of lutein, with and without DMPC or DPMG, were administered to the ocular surface of healthy volunteers with prior informed consent. Next, tear fluid samples were taken from each volunteer at 15 s, 60 s, 150 s, 300 s and 450 s. The samples were processed for lutein extraction. The lutein concentration in each sample was determined using proprietary HPLC and/or HPLC-MS techniques.

Figure 10:
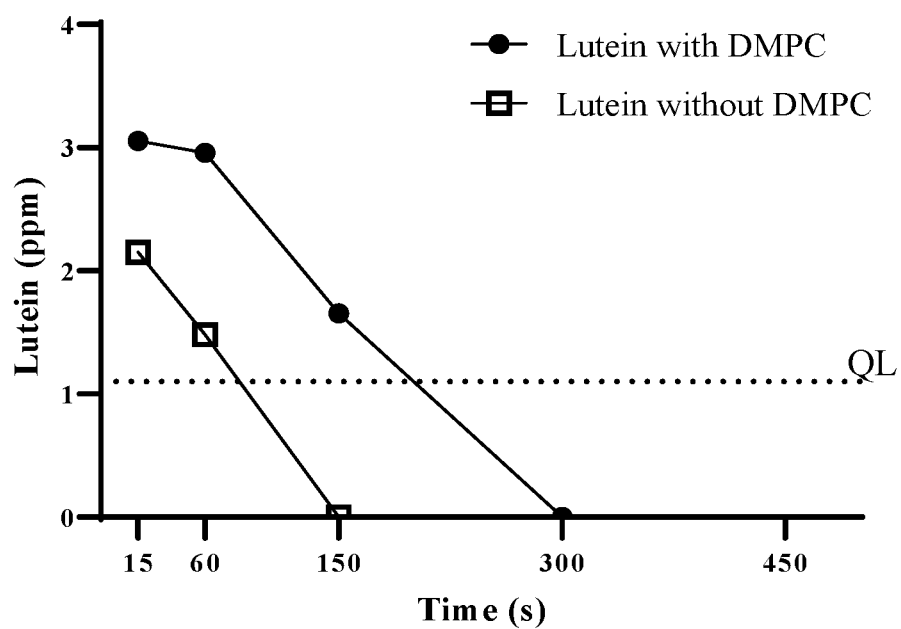
FIG. 10 illustrates the residence period of Xanthophyll on the ocular surface. Quantification limit (QL) is represented by a dotted line.

Lutein concentrations were plotted vs. the time in which the sample was obtained. A curve for the lutein formulation with DMPC and a curve for the lutein formulation without DMPC were obtained (FIG. 10). When comparing both curves, it was found that the addition of DMPC to the formulation promotes the retention of lutein on the ocular surface for a longer time and in a higher extent. That is, a higher concentration of lutein was found in the first measurement when using the DMPC-formulation and this event was maintained along the time. Moreover, with the DMPC-formulation, lutein was yet quantified in the tear samples at 150 s sampling point, while the lutein from the formulation without DMPC was quantifiable only for 60 s. Therefore, the addition of DMPC to the formulation allows the retention of lutein in the ocular surface in a higher extent and for a longer time than the formulation without this phospholipid.

B) Approximately 50 µL of a formulation of astaxanthin, with and without DMPC or DPMG, were administered to the ocular surface of healthy volunteers with prior informed consent. Their eyelids were held closed manually for 30 s. Next, tear fluid samples were taken from each volunteer at 15 s, 60 s, 150 s, 300 s and 450 s. The samples were processed for astaxanthin extraction. The lutein concentration in each sample was determined using proprietary HPLC and/or HPLC-MS techniques.

C) Approximately 50 μL of a formulation of zeaxanthin, with and without DMPC or DPMG, were administered to the ocular surface of healthy volunteers with prior informed consent. Their eyelids were held closed manually for 30 s. Next, tear fluid samples were taken from each volunteer at 15 s, 60 s, 150 s, 300 s and 450 s. The samples were processed for zeaxanthin extraction. The lutein concentration in each sample was determined using proprietary HPLC and/or HPLC-MS techniques

The invention claimed is:

1. An ophthalmic pharmaceutical composition in the form of an oil-in-water (O/W) emulsion comprising lipid particles; characterized in that it comprises:
   a) at least one mixture comprising a xanthophyll and an ophthalmic acceptable oil;
   b) at least one organic polyol compound;
   c) at least one polymer that has been fully or partially mechanically fragmented;
   d) at least one phospholipid; and
   e) at least one pharmaceutically acceptable excipient,
wherein the lipid particles of the O/W emulsion have a net negative charge of less than −20 mV; and
wherein when the ophthalmic pharmaceutical composition is applied to the eye of a subject it is maintained on the ocular surface and functions as a blue light filter.

2. The ophthalmic pharmaceutical composition according to claim 1, wherein the xanthophyll compound is in the form of an extract selected from the group consisting of Flavoxanthin; Lutein; Cryptoxanthin; Rubixanthin; Violaxanthin; Rhodoxanthin; Cantaxanthin; Zeaxanthin; Astaxanthin; Chlorophyll; and/or any other oxygenated derivative of carotenoids; including any mixture thereof, salts or mixtures of salts, isomers and mixtures of isomers.

3. The ophthalmic pharmaceutical composition according to claim 1, wherein the ophthalmic oil is selected from the group consisting of castor oil, lanolin oil, mineral oil, peanut oil, polyoxyl 35 castor oil and polyoxyl 40 hydrogenated castor oil.

4. The ophthalmic pharmaceutical composition according to claim 1, wherein the organic polyol compound is selected from the group consisting of polyethylene glycol, propylene glycol, 1,2-propylene glycol, 1,3-propylene glycol, sorbitol, derivatives thereof, and any combination thereof.

5. The ophthalmic pharmaceutical composition according to claim 1, wherein the polymer is selected from the group consisting of polysaccharides, polycarbophil, hyaluronic acid, guar gum, chondroitin sulfate, carboxymethylcellulose sodium, derivatives thereof, salts, and any combination thereof.

6. The ophthalmic pharmaceutical composition according to claim 1, wherein the phospholipid is selected form the group consisting of phosphatidylglycerols, phosphatidylinositols, diphosphatidylglycerols, phosphatidyl sugars, phosphatidylcholines, phosphatidylethanolamines, sphingomyelin, derivatives thereof, and any combination thereof.

7. A process for the manufacture of the blue light filter composition as claimed in claim 1, wherein the process comprises the following steps:
   a) adding 60-65% of water for injection in a stainless-steel tank, at a temperature of 20-30° C.;
   b) stirring continuously while adding the ophthalmic acceptable oil containing the xanthophyll, the at least one organic polyol compound, the at least one polymer that has been fully or partially mechanically fragmented, the at least one phospholipid, and the at least one pharmaceutically acceptable excipient;
   c) carrying out a mechanical emulsification process until a completely homogeneous product is obtained;
   d) sterilizing the emulsion by filtration using sterilizing membranes with pore size of 0.2 pm; and wherein the resulting mixture is subjected to a 60 minute homogenization process and a mechanical emulsification process of at least three cycles in a pressure range of 10,000 psi (68947591 Pa) to 30,000 psi (206842773 Pa).

8. A pharmaceutical system comprising:
a polyethylene container with a locking device for preserving sterility of compositions; and
the pharmaceutical composition of claim 1.

* * * * *